United States Patent [19]

Mulkins

[11] 4,261,091
[45] Apr. 14, 1981

[54] INTERIOR CORNER GUARD FOR PLASTIC LAMINATES

[76] Inventor: Roy H. Mulkins, 3344 SE. 150th, Portland, Oreg. 97236

[21] Appl. No.: 53,779

[22] Filed: Jul. 2, 1979

[51] Int. Cl.³ .............................................. B23Q 1/00
[52] U.S. Cl. ...................................... 29/283; 52/514; 248/345.1; 206/453; D8/366
[58] Field of Search ........................... 29/283; 52/514; 248/345.1; 206/453; D8/366; 24/67.9, 8 BF, 255 R, 259 R

[56] References Cited

U.S. PATENT DOCUMENTS

| 1,913,864 | 6/1933 | Walper | 24/259 R |
| 3,294,229 | 12/1966 | McConnell et al. | 24/67.9 |

Primary Examiner—James L. Jones, Jr.
Attorney, Agent, or Firm—D. Paul Weaver

[57] ABSTRACT

To prevent the cracking of plastic laminates used to make kitchen counter tops and the like, necessitating the formation of interior corners in the laminates, a clip-like interior corner guard having a corner filler element is slipped over the laminate at the interior corner to strengthen such corner against bending likely to cause cracking during necessary handling of the laminate prior to final fitting and installation. The corner guard can be molded from a tough plastic.

6 Claims, 4 Drawing Figures

U.S. Patent     Apr. 14, 1981     4,261,091
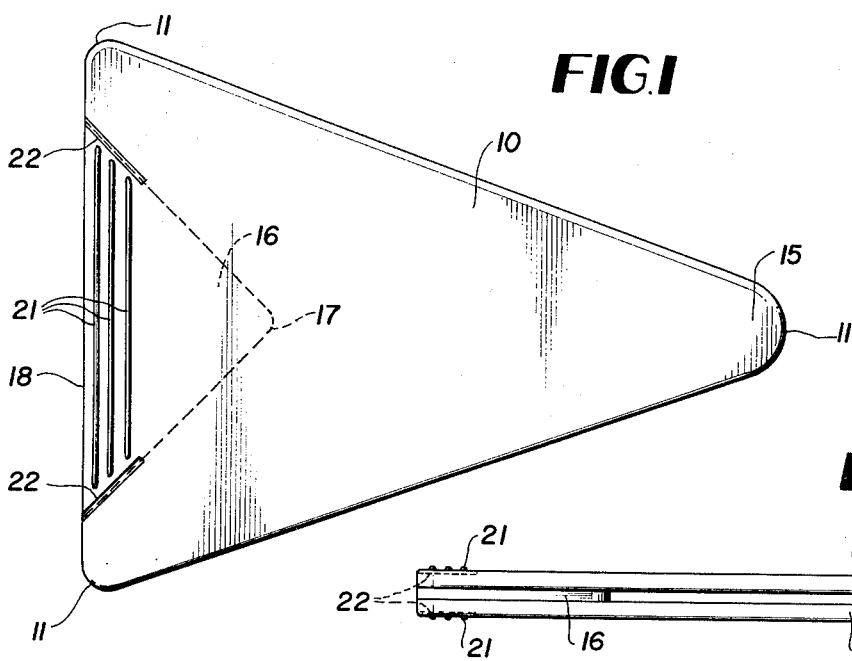
FIG.1
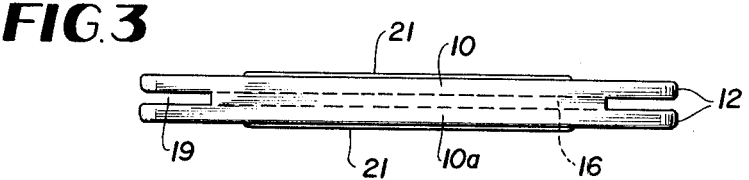
FIG.2
FIG.3
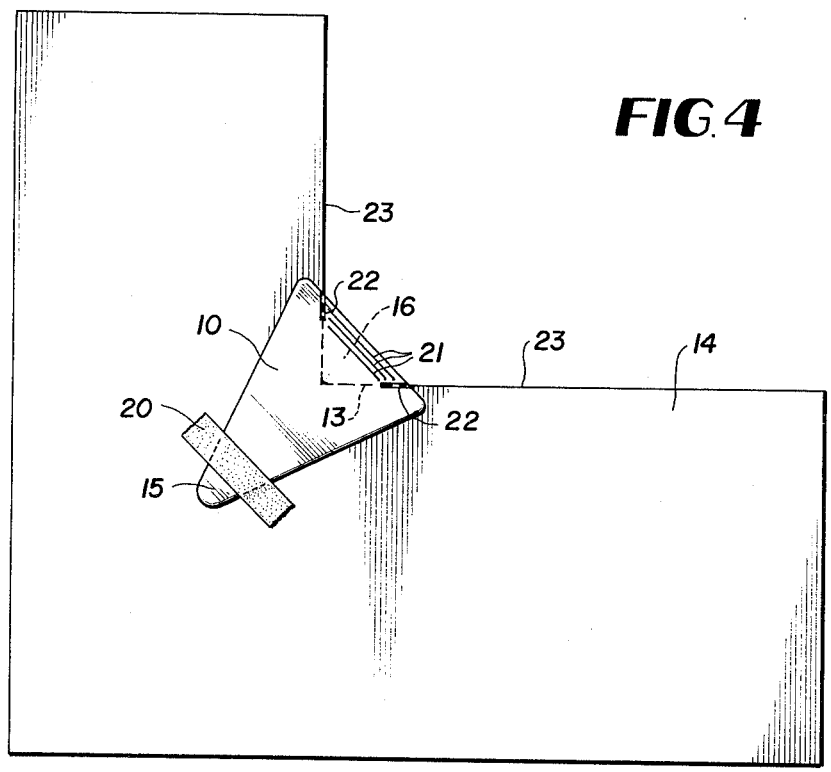
FIG.4

INTERIOR CORNER GUARD FOR PLASTIC LAMINATES

BACKGROUND OF THE INVENTION

Installers of kitchen counter tops made from plastic laminates such as "Formica" usually find it necessary to cut from a large laminate sheet an L-shaped or a U-shaped section. This necessitates the formation of one or two interior right angle corners in the sheet material. Similar cutting procedures are involved where the laminates are used to cover wall surfaces around window openings.

The fact that the laminate has a great tendency to crack at the interior corner is a difficult problem for the installer or carpenter to deal with without ruining the expensive material. The problem is compounded by the fact that the installer must handle the cut laminate several different times, sometimes up to five times, before final installation. For example, the material is roughly cut out, picked up and placed on a counter top and scribed to show where it must be further cut for a finished fit. It is then removed from the counter top to be cut along the scribe lines, is placed back on the counter top to check the fit, and then removed and inverted to receive a coating of contact cement on the rear side. Finally, when the cement is dry enough for installation, the laminate is turned over and placed permanently on the counter top. Each such handling increases the likelihood of cracking at interior corners. Such cracking can be very costly as where the entire piece is ruined.

Traditionally, to reinforce the material during handling, installers apply masking tape across the interior corners. This procedure, while helpful, is only partly effective and the piece must be handled with great care to prevent interior corner cracking.

The present invention is concerned with a complete and practical solution to the above problem through provision of a simple unitary interior corner guard of tough relatively rigid material which is slipped onto each interior corner like a paper clip by the installer to greatly reinforce the corner region against bending during necessary handling of the laminate and thus essentially eliminating the hazard of cracking the material.

Preferably, the guard is of triangular form with rounded corners and is formed of a tough plastics material by molding. In some cases, a built-up guard consisting of several pieces permanently assembled can be utilized. In all cases, the corner guard includes two outer plate sections to straddle the plastic laminate and an intermediate interior corner filler section which is moved into contact with the converging angular edges of the laminate forming the interior corner. For further convenience, the guard, if desired, can be made of transparent plastic. It may also be grooved or marked near its rear corners to provide a visual indication of the proper alignment with the laminate edges forming the inside corner. Near its rear end, the guard can be ribbed or grooved to promote a better finger grip for removing the guard from the laminate when it has served its intended purpose. The guard can be constructed to snugly grip the laminate between the two outer plates thereof for maximum effectiveness.

The below-listed prior United States patents of some general interest relative to this invention are made of record under 37 C.F.R. 1.56:

U.S. Pat. No. 209,024
U.S. Pat. No. 643,952
U.S. Pat. No. 1,016,278
U.S. Pat. No. 2,203,987
U.S. Pat. No. 2,417,961
U.S. Pat. No. 3,030,728
U.S. Pat. No. 3,679,198.

BRIEF DESCRIPTION OF THE DRAWINGS

FIG. 1 is a plan view of a corner guard embodying the present invention.

FIG. 2 is a side elevation thereof.

FIG. 3 is a rear end elevation of the guard.

FIG. 4 is an application plan view illustrating the use of the guard.

DETAILED DESCRIPTION

Referring to the drawings in detail wherein like numerals designate like parts, a crack inhibiting guard for interior corners cut in sheets of plastic laminates used for making counter tops and the like comprises top and bottom identical plate sections 10 and 10a of substantially triangular formation, FIG. 1, and having rouned corners 11 and rounded marginal edges 12 to avoid concentrating pressure points when the guard is applied to the inside corner 13 of a cut counter top section 14, as illustrated in FIG. 4.

Near the base of the corner guard away from its apex 15, an intermediate corner filler element 16 is sandwiched between the two plate sections 10 and 10a and fixedly secured thereto. The corner filler element 16 is in the form of a right triangle with its right angular apex 17 lying on a common center line through the apex 15 of plate sections 10 and 10a. As shown in FIGS. 1 and 3, the converging sides of the filler element 16 intersect the rear edge 18 of the guard at points inwardly of the two rear rounded corners 11.

Preferably, but not necessarily, the guard is molded as a unit from a tough plastics material which is durable and quite rigid. In some instances, the plate sections 10 and 10a and the filler element 16 can be separately formed and secured in assembled relationship by adhesive and/or small screws. The two plate sections 10 and 10a are of equal thickness and the filler element 16 can be somewhat thinner, as illustrated. The thickness of the element 16 establishes the thickness of the gap 19 between plate sections 10 and 10a and this gap thickness or width is such that the guard will snugly grip the laminate sheet 14 when applied thereto like a paper clip with the corner filler element in solid registration with the interior corner 13 being reinforced against cracking by the guard, FIG. 4.

In a practical embodiment of the guard, the plate sections 10 and 10a may be about $\frac{1}{8}$ inch thick and the element 16 may be 3/32 inch thick. The guard may be 8 inches long from the base 18 to the corner 11 at apex 15 and 7$\frac{1}{2}$ inches wide between the other corners 11. The right angular filler element 16 may have its apex 17 projecting forwardly 3$\frac{1}{2}$ inches from the base 18. These dimensions are not critical and may be varied in practice. If the guard is fabricated from separate pieces of sheet material, tempered "Masonite" is a suitable material.

To stabilize the guard during use, a section of masking tape 20, FIG. 4, can be applied across or near the apex 15.

The guard is symmetrical and reversible. To enhance its convenience, several grooves or ribs 21 are preferably formed across the guard on both outer surfaces thereof along the base line 18. This allows a firmer finger grip when removing the guard which snugly embraces the laminate sheet. Additionally, gauge lines 22 or grooves are provided on both sides of the guard in right angular relationship and converging forwardly from the base 18. When the guard is properly applied to the interior corner 13 with the edges of the filler element 16 in full engagement with the edges 23 forming the inside corner 13, the gauge lines 22 will register with the edges 23, FIG. 4.

The guard, when thus applied to the work, precludes bending of the laminate in the inside corner region and thus prevents stressing the material at the critical corner where cracking tends to occur during necessary handling operations. The invention is characterized by simplicity, economy of manufacture, convenience of use including reversibility, and maximum effectiveness in preventing the costly cracking of laminates at inside corners.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A guard to resist cracking of sheet material in areas of the material where bending stresses are concentrated, said guard comprising a pair of stiff bend-resistant plate elements in spaced parallel relationship, and a filler element of predetermined thickness disposed between and secured to the plate elements near corresponding ends thereof with major portions of the plate elements extending beyond the filler element in cantilevered relationship relative thereto, whereby the guard may be engaged over an edge of sheet material in an area where bending stresses are concentrated to resist bending in such area and thus prevent cracking of the material, said filler element being a right angular element adapted to be fitted into an interior right angular corner of sheet material subject to high bending stresses in such corner, said guard and plate elements being roughly triangular and the right angular apex of the filler element lying on a common center line through the apex of the guard most distant from the filler element, and said guard and plate elements being in the form of an isosceles triangle and said filler element being in the form of a right isosceles triangle with the bases of the two triangles disposed along a common edge of the guard most distant from the apex of the guard, whereby there is a substantial distance between the apices of the two triangles.

2. A guard as defined in claim 1, and the three corners of the guard being rounded and the right angular apex of the filler element is rounded.

3. A guard as defined in claim 1, and the base of the guard along said common edge extending equidistantly outwardly beyond the terminals of the base of the filler element along said common edge, whereby said plate elements extend on opposite sides of the filler element as well as longitudinally in one direction beyond the filler element.

4. A guard as defined in claim 1, and finger grip means on opposite sides of the guard along the edge thereof nearest to the filler element.

5. A guard as defined in claim 1, and a pair of converging gauge lines on opposite sides of the guard and coinciding with the side edges of the filler element forming the right angle of the filler element, said gauge lines substantially intersecting the edge of the guard forming a common base line for the plate elements and said filler element.

6. A guard to resist cracking of sheet material particularly at interior corners of the material where bending stresses are concentrated, the guard comprising a pair of stiff bend-resistant plate elements in spaced parallel relationship, and an interior corner filler element of predetermined thickness disposed between and secured to the plate elements along an edge common to the plate elements and filler element, the filler element extending forwardly from said common edge for a substantial distance between the plate elements and the filler element having side edges which converge forwardly from said common edge to define an angle adapted for insertion in an interior corner of said sheet material when the guard is engaged with the material, and the forward ends of the plate elements projecting substantially forwardly from the apex of the angle defined by the converging side edges of the filler element to proqide broad areas of contact between the plate elements of the guard and sheet material to which the guard is engaged to resist cracking thereof.

* * * * *